M. C. Bryant.

Loom for Weaving Pile Fabrics.

No. 475. Reissued Jun. 30, 1857.

M. C. Bryant.

Loom for Weaving Pile Fabric.

No. 475. Reissued Jun. 30, 1857.

M. C. Bryant.
Loom for Weaving Pile Fabrics.

No. 475. Reissued Jun. 30, 1857.

M. C. Bryant.
Loom for Weaving Pile Fabrics.
No. 475.
Reissued Jun. 30, 1857.
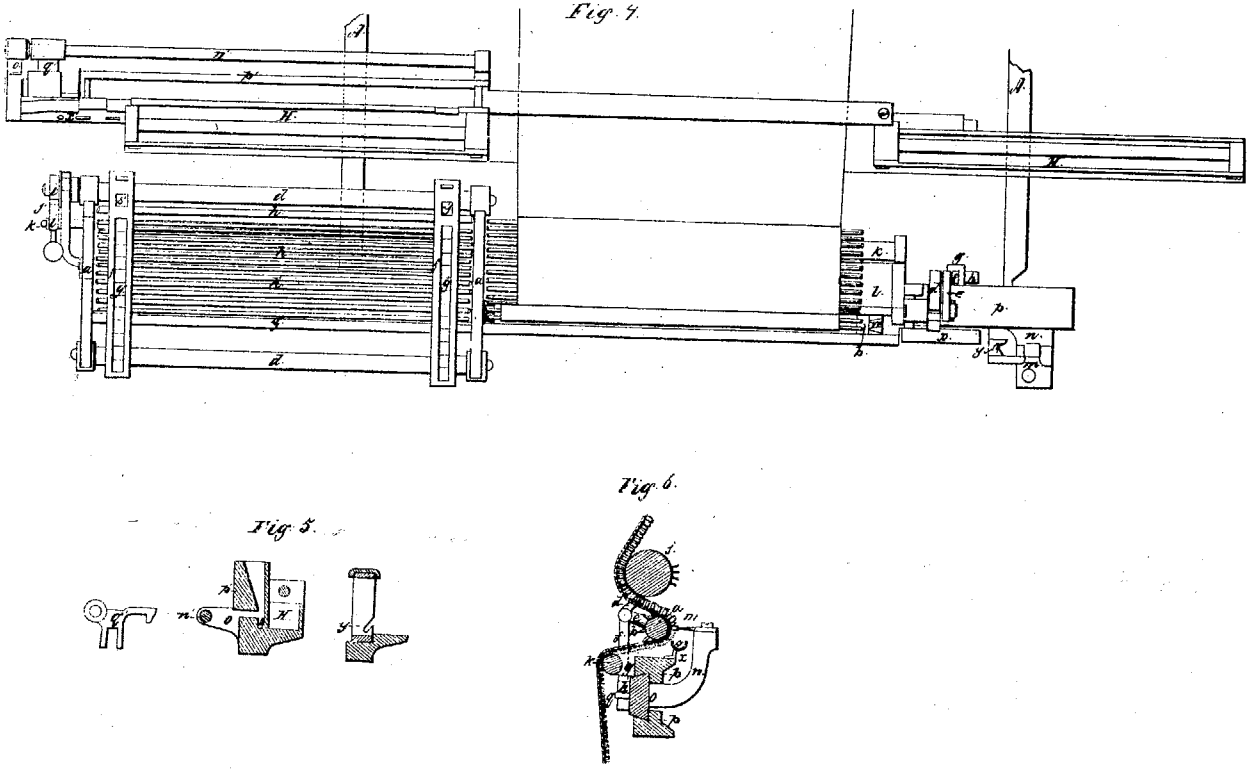

UNITED STATES PATENT OFFICE.

MERTOUN C. BRYANT, OF LOWELL, MASSACHUSETTS, ASSIGNOR TO E. G. BIGELOW.

IMPROVEMENT IN LOOMS FOR WEAVING PILED FABRICS.

Specification forming part of Letters Patent No. 7,189, dated March 19, 1850; Reissue No. 175, dated June 30, 1857.

*To all whom it may concern:*

Be it known that I, MERTOUN C. BRYANT, of Lowell, in the county of Middlesex and State of Massachusetts, have invented certain new and useful Improvements in the Power-Loom for Weaving Piled Fabrics; and I do hereby declare that the following is a full and exact description thereof, reference being had to the accompanying drawings, and to the letters of reference marked thereon.

Figure 1:
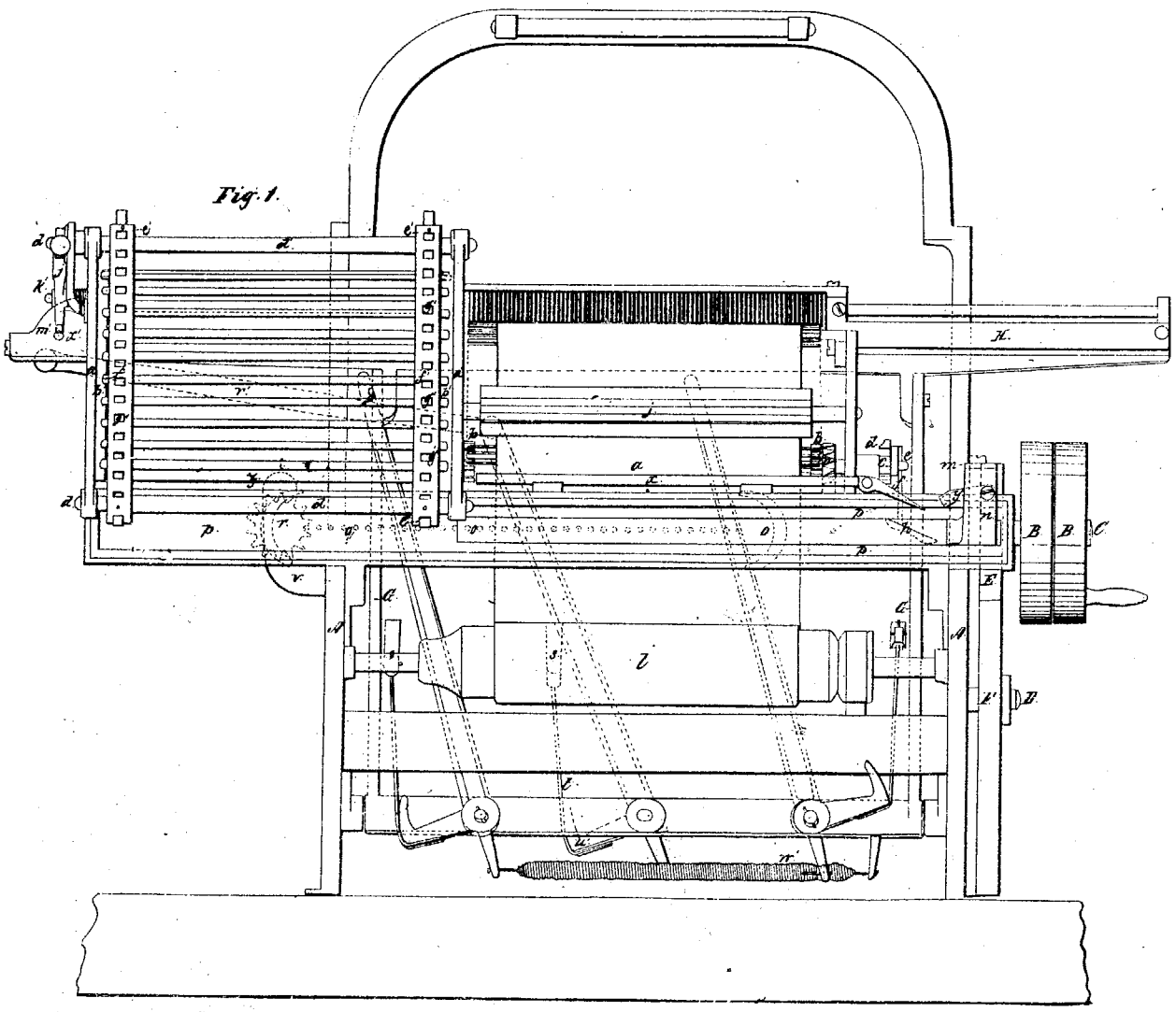
Figure 2:
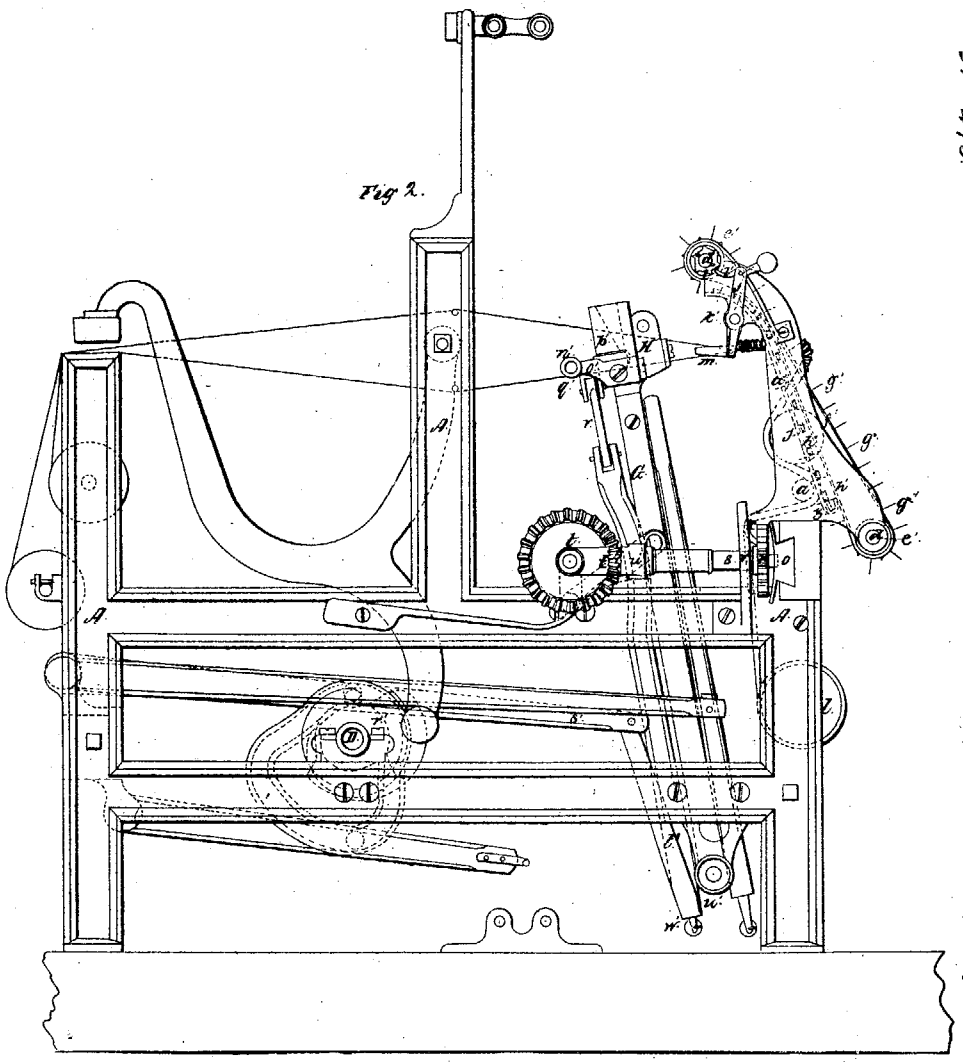
Figure 3:
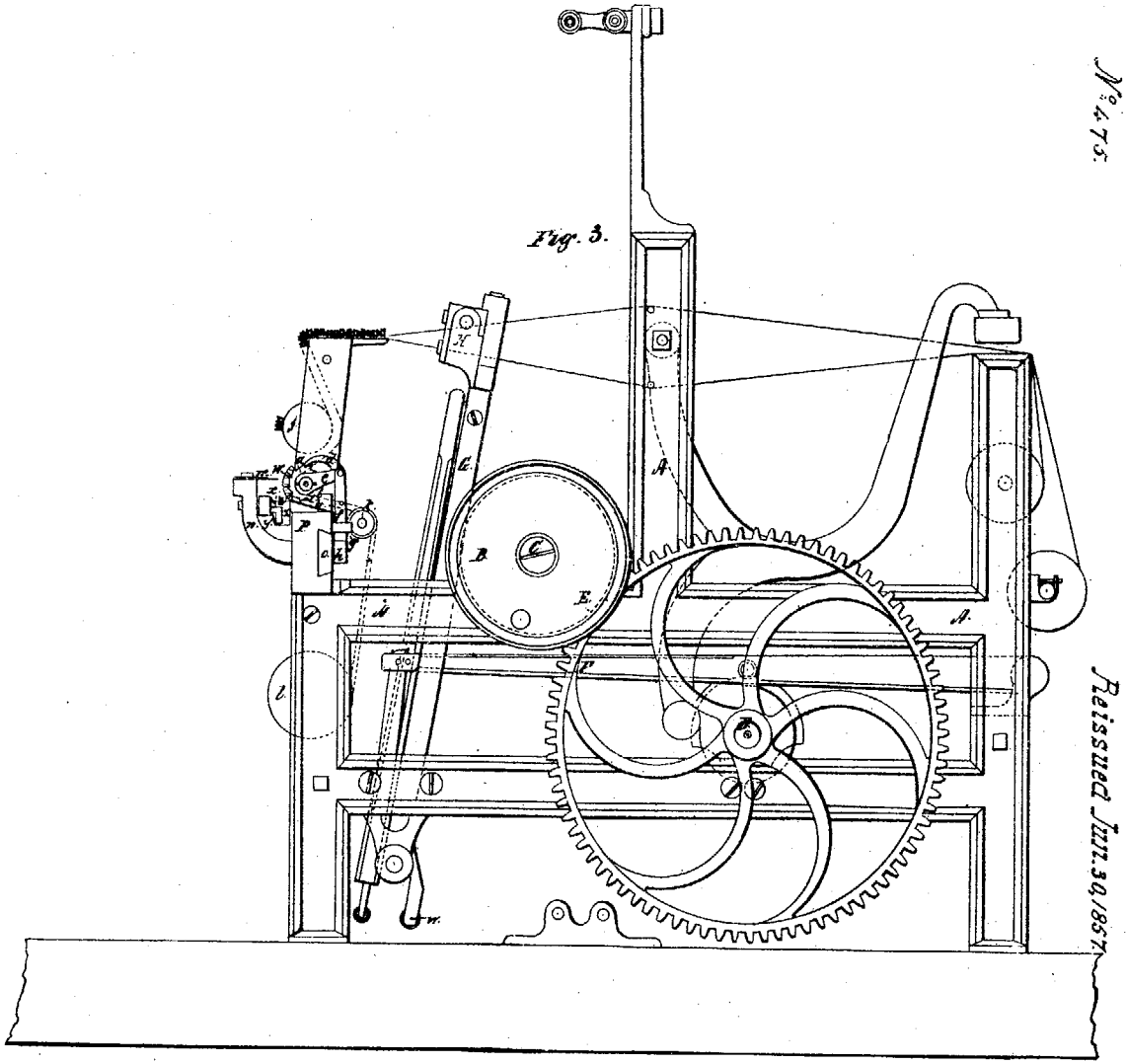

Figure 1 is a front elevation of the loom; Fig. 2, an elevation of the left-hand side; Fig. 3, an elevation of the right-hand side; Fig. 4, a plan of the lathe and wire apparatus; Fig. 5, separate views of parts of the lathe, and Fig. 6 a cross vertical section of the apparatus for taking up the cloth and of the knife for cutting the pile.

My invention relates to the mode of operating the pile-wires to form the pile, and also to the mode of cutting the pile on said wires to produce a velvet piled fabric.

The nature of the first part of my said invention consists in the mode of organizing the mechanism for transferring the pile-wires from the cloth to the shed of the warps, whereby said wires are successively pushed in or onto a revolving carrier, moved forward in series toward the lathe, and in succession pushed into the shed, said wires, when pushed as aforesaid, being held in position and guided by grooves or troughs.

The nature of the second part of my invention consists in the mode of organizing the mechanism for successively cutting the rows of loops or pile on the pile-wires to form a velvet piled fabric, whereby a knife is made to traverse to and fro across the cloth in such a manner as to pass the point or cutting-edge thereof in grooves formed in the edges of said pile-wires, said knife being guided and said pile-wires being held and successively brought forward by rollers in such a manner as to cause said knife to cut in succession the rows of loops or pile on said wires.

In the accompanying drawings, A represents the frame; B, the driving-pulley; C, the lathe; D, the cam-shaft, and E F the cogged pinion and wheel which communicate motion from the driving-shaft to the cam-shaft, all of which are of the usual construction, except so far as will be hereinafter described. The stop-motions and many other parts common to power-looms are not represented, and will not be described, as they are not essential to a clear understanding of my improvements.

With a view to a clear description, I will invert the order of the operations, and commence with the description of the mode of taking up the woven fabric, and trace back the construction and operation to the introduction of the pile-wires under the figuring-warps. The warps pass through the harness and reed in the usual way, and the woven cloth passes over a guide-roller, (not lettered on the drawings, but indicated by dotted lines,) thence around another roller, *j*, (mounted and turning on appropriate journals), the periphery of which is formed with ribs parallel with its axis, and at such distances apart as to correspond with and enter the spaces between the ranges of loops. From this the cloth passes in a reversed direction around a take-up roller, *a*, which at each end, beyond the selvages of the cloth, is provided with cogs *b b*, which enter between the ends of the pile-wires that project beyond the selvages of the cloth. Those cogs should be appropriately pointed to enter freely, and their distance apart and the diameter of the roller should be so proportioned as to prevent any slip—that is to say, the pitch-line of the cogs and of the wires, when the cloth lies on the periphery of the roller, should have the same radius. The cloth then passes from the take-up roller *a*, around a guide-roller, *k*, and thence to the cloth-beam *l*, on which it is rolled up in the usual way.

For the purpose of taking up the cloth with a regular intermittent motion on the end of the shaft of the take-up roller *a*, there is a ratchet-wheel, *c*, with as many teeth as there are cogs *b* on each end of the said roller, and at every operation this wheel is turned to the distance of one tooth by a pawl, *d* jointed to the end of a radial arm, *e*, which vibrates on the shaft of the take-up roller *a*, and to the outer end of this arm *e* is jointed a bar, *f*, which slides vertically in a stand, *g*, attached to the frame, and at each operation of the knife (to be presently described) this bar is lifted by an inclined plane, *h*, attached to the knife-carriage *o*, to the required distance to turn the ratchet-wheel the distance of one tooth, and as the inclined plane *h* moves from under the bar *f* it descends by gravity, carrying back the pawl to be ready for another operation, the ratchet-wheel being prevented from turning back by a catch-hand in the usual manner, which therefore need not be represented.

From the foregoing description it will be seen that the cloth is taken up by a positive intermittent motion, and that at each operation it will be carried forward a distance equal to the space between any two of the ranges of figuring-loops; and as the pile-wires over which the loops are formed are flat, with grooved edges, and are woven into the cloth so as to stand edgewise, it follows that at each operation of the take-up roller, one wire will be presented horizontally in front of the said take-up roller, with one range of figuring-loops over one of its grooved edges.

When the cloth is in the position just above described, the cutting operation takes place. There is a lancet-pointed knife, M attached horizontally to an arm, *n*, of a carriage, *o*, which slides horizontally in ways made in the back part of a beam, which takes the place of the breast-beam of an ordinary loom, and which is slotted to allow the arm *n*, which passes through to the front, to move back and forth with the carriage and the knife attached to it. The knife is attached to the arm *n* by a screw, so that its point can be accurately adjusted to cut through the figuring-loops, and yet not reach the bottom of the groove in the edge of the pile-wire. The range of motion of the knife must be exactly parellel with the line of the pile-wire presented by the take-up roller. The reciprocating cutting motion is given to the carriage of the cutter by means of the well-known mangle motion. The mangle-pins *q*, attached to the back of the carriage *o*, are represented by dotted lines in Fig. 1, as also the mangle-pinion *r*, which is more fully represented in Fig. 2, attached to the outer end of the mangle-shaft *s*, which vibrates on a stud-pin in the line of the axis of the driving-shaft C, which carries a bevel-wheel, *t*, that engages the cogs of a corresponding pinion, *l*, on the mangle-shaft, and the outer end of the mangle-shaft, as it is carried up and down by the mangle movement, is guided by the usual slotted guide, *v*, attached to the frame. As the knife begins to make its cutting motion by the operation of the mangle-pinion, the point of the knife is guided, to insure its entrance into the groove of the pile-wire, by the cogs of a guide-wheel, *w*, attached to one end of the take-up roller *a* and just beyond the cogs *b*. The cogs of the said wheel *w* are on the outside beveled or wedge-formed, that the point of the knife may enter between them freely, and at the inner edge of the wheel they are just far enough apart to allow the knife to pass between them freely, and, as the cogs of the wheel W correspond with the cogs *b*, which hold the pile-wires between them, the point of the knife must of necessity enter the groove of that part of the pile-wire which projects beyond the selvage of the cloth, and then the said groove continues to guide the knife during the whole of its cutting operation. So soon as the knife has cut through the breadth of the cloth it is carried back by the mangle-pinion, and at the end of the back motion the inclined plane *h*, attached to the carriage, (before described,) elevates the sliding-bar *f*, which operates the ratchet-wheel *c* to turn the take-up roller and carry off the range of loops which have been cut and present another range to be cut. When this takes place, the pile-wire drops out of the cut loops into a groove or trough, *x*, below, from which it is pushed at the next cutting operation into the carrier groove or trough *z* by a pusher, *y*, jointed to the arm *n* of the cutter-carriage before mentioned. The swinging end of the pusher *y* is fitted to the groove or trough *x*, and rests on the bottom thereof, so that when the cutting operation is performed it bears against the end of the pile-wire and pushes it out of said groove or trough *x* into said carrier groove or trough *z*; but as the end of the wire must be carried beyond the end of said groove or trough *x*, the pusher *y* is carried beyond the end thereof, and then falls and is carried back below it to clear the next wire, which in the mean time may have fallen from the cut loops into the aforesaid grooves or trough *x*. Toward the end of its back movement the said pusher *y* lifts up a jointed inclined plane & to pass under it, which inclined plane then falls down again to form an inclined guide to raise and guide the pusher *y* into the trough *x* at the commencement of the next cutting and pushing operation. In this way the operations succeed each other to the end of the piece of cloth. The carrier groove or trough *z* is of less length than the pile-wires, that while lying therein their ends may project beyond each end of the said groove or trough. The revolving carrier consists of two chains, *f' f'*, each of which passes around two spur-wheels, *e' e'*, on each end of the two parallel shafts *d' d'*, mounted in an appropriate inclined frame, *a'*, attached to the side of the loom. The spurs of the wheels *e' e'* enter perforations in the chains or belts, or are otherwise properly geared thereto, that the two may move in unison. The upper one of the shafts, *d'*, carries a ratchet-wheel, *i'*, for moving the revolving carrier, which is turned at the required time by the lathe.

*l'* is a pawl jointed to the upper end of a lever, *j'*, which lever vibrates on a fulcrum-pin, *k'*, its lower arm having a projection, *m'*, which enters a hole, *x'*, in the left-hand shuttle-box, that the lathe may make some of its beats without communicating motion to said carrier, for in weaving fabrics of this kind the lathe makes more than one beat for every wire. When, however, the wires are to be moved forward, this hole is closed up, in a manner to be presently described, and then the next beat of the lathe strikes the arm *m'* of the lever *j'*, and turns said revolving carrier the required distance to transfer a wire. The chains, which in part compose said carrier, carry pins $g'$, which project from their surfaces at equal distances apart, which pins, as the carrier is moved, come against the projecting ends of the pile-wires and carry them up a guide-plane, $h$, which extends up from the back edge of the carrier groove or trough $z$, and at the upper end the said plane is curved back to a horizontal direction, so as to just overhang a wire groove or trough, $p'$, attached to the left-hand side of the lathe and back of the shuttle-box, so that at the appropriate beat, when the lathe is moved forward, the arm $m'$ of the ratchet-lever is pressed forward, which moves the carrier to drop one wire into the wire groove or trough $p'$, which is formed as represented in the cross-section, Fig. 5, that the wire may rest in the bottom thereof with one edge up. In this wire groove or trough a pusher, $q'$, plies, which runs on a rod, $w'$, in manner similar to a picker. It extends forward through an opening in the back of said wire groove or trough, and its front end is fitted to run in the part of the groove or trough in which the wire lies, so that when moved inward it shall push the wire into the open shed of the warps. The dents of the reed (see Fig. 5) are formed with slots $y'$, cut in from the front edge and corresponding with the bottom of the wire groove or trough $p'$, so that when the wire is pushed into the shed the dents form guides and supports for it along its whole length. The pusher $q'$ is operated by a cam, $r'$, on the cam-shaft D, which acts on a treadle or lever, $s'$, connected by means of a strap, $t'$, with the bent arm of a lever, $u'$, (similar to a picker-staff,) the upper arm of which is connected with the pusher $q'$ by a joint-link, $v'$. The form of the cam $r'$ is represented in Fig. 2, and is such that after a wire has been woven in—that is to say, after the loom has made the required number of picks to secure a range of loops—the periphery of the cam is depressed to permit the pusher to be drawn back by the helical spring $w'$, connected with the lever $u'$, sufficiently far to be opposite the hole $x'$ in the shuttle-box H. The lathe then is carried forward, and the pusher, being opposite the hole $x'$, strikes the projecting part $m'$ of the pawl-lever $j'$, which actuates the revolving carrier to deliver a wire over the edge of the guide-plane $h'$, from which it falls into the wire groove or trough $p'$, and therein takes the position represented in Fig. 5. The cam $r'$ then runs out from the axis to elevate the treadle-lever and push the wire through the slots in the dents and into the open shed of the warps. The periphery of the cam then runs in toward the axis to draw back the pusher, but not so far back as to be opposite the hole $x'$ in the shuttle-box, for the lathe must make its intermitting beats without operating the revolving carrier; but when a wire is to be transferred the said cam $r'$ has a slight depression, as before stated, which permits the pusher to be drawn back a little by the spring $w'$ to give the required movement.

The axis of vibration of the lathe and the line of warps and cloth must be such that after a wire has been pushed into the slots of the dents and under the open shed of the warps, as the lathe beats up to carry the wire to the woven part of the cloth, the slots in the dents, by the vibration of the lathe, may be carried below the warps, and by this means gradually leave the wire standing edgewise under the figuring-warps and next to the range of loops previously formed.

I do not intend to limit myself to the precise form and arrangement of the parts as herein described, as they may be greatly varied in these respects without changing their essential character.

Having described my said improvements, what I claim therein as my invention, and desire to secure by Letters Patent, is—

1. The method of transferring the pile-wires in series from the cloth to the shed of the warps, substantially as specified.

2. The method of successively cutting the rows of loops or pile on the pile-wires, substantially as specified.

MERTOUN C. BRYANT.

Witnesses:
GEO. M. ELLIOTT,
SAMUEL COOPER.